United States Patent
Lee et al.

(10) Patent No.: US 9,230,304 B2
(45) Date of Patent: Jan. 5, 2016

(54) APPARATUS AND METHOD FOR ENHANCING IMAGE USING COLOR CHANNEL

(75) Inventors: Sang-Keun Lee, Seoul (KR); Jin Kim, Seoul (KR)

(73) Assignee: Chung-Ang University Industry-Academy Cooperation Foundation, Seoul (KR)

( * ) Notice: Subject to any disclaimer, the term of this patent is extended or adjusted under 35 U.S.C. 154(b) by 0 days.

(21) Appl. No.: 14/369,793

(22) PCT Filed: Sep. 12, 2012

(86) PCT No.: PCT/KR2012/007315
§ 371 (c)(1),
(2), (4) Date: Jun. 30, 2014

(87) PCT Pub. No.: WO2013/103184
PCT Pub. Date: Jul. 11, 2013

(65) Prior Publication Data
US 2014/0369601 A1 Dec. 18, 2014

(30) Foreign Application Priority Data
Jan. 3, 2012 (KR) ........................ 10-2012-0000390

(51) Int. Cl.
G06K 9/40 (2006.01)
G06T 5/00 (2006.01)
G06T 5/40 (2006.01)

(52) U.S. Cl.
CPC ................ G06T 5/001 (2013.01); G06T 5/009 (2013.01); G06T 5/40 (2013.01); *G06T 2207/10024* (2013.01); *G06T 2207/20208* (2013.01)

(58) Field of Classification Search
None
See application file for complete search history.

(56) References Cited

U.S. PATENT DOCUMENTS

| | | | | |
|---|---|---|---|---|
| 2002/0114513 A1* | 8/2002 | Hirao | ..................... | H04N 1/608 382/167 |
| 2006/0182359 A1* | 8/2006 | Lee | ......................... | G06T 5/007 382/254 |
| 2008/0101719 A1* | 5/2008 | Lim | ..................... | H04N 1/4072 382/274 |

* cited by examiner

*Primary Examiner* — Eueng-Nan Yeh
(74) *Attorney, Agent, or Firm* — William Park & Associates Ltd.

(57) ABSTRACT

Provided are an apparatus and method for enhancing an image using a color channel. A pre-processing unit generates an inverted image by inverting a luminance component estimated from a red (R) channel among color channels of a red, green, and blue (RGB) color space of an input image. A channel merging unit generates a merged luminance (L) channel by merging an L channel of an International Commission on Illumination (CIE) L*a*b* (CIELab) color space of the input image and the inverted image. A contrast enhancement unit enhances contrast by expanding a histogram of the merged L channel. A color restoration unit combines the merged L channel whose contrast has been enhanced and chromaticity components of the input image, and converts a resultant color image to the RGB color space, thereby generating a restored image.

15 Claims, 3 Drawing Sheets

APPARATUS AND METHOD FOR ENHANCING IMAGE USING COLOR CHANNEL

TECHNICAL FIELD

The present invention relates to an apparatus and method for enhancing an image using a color channel, and more particularly, to an apparatus and method that use information included in a color channel of a single image to enhance the contrast of the image.

BACKGROUND ART

An image captured by a general digital camera has a limited dynamic range that expresses tonal gradation, and thus it is difficult to express a high dynamic range. To overcome such a limitation, an image enhancement method using characteristics of an infrared image that cannot be perceived by humans has been proposed.

Methods disclosed in "Image enhancement through weighting function estimation with infrared image (J. S. Kim et al., 2010)," "Merging thermal and visual images by a contrast pyramid (Toet a et al., 2007)," etc., are based on merging of an image captured in an infrared region and an image captured in a visible region. The merging uses a characteristic in which a charge-coupled device (CCD) or a complementary metal-oxide semiconductor (CMOS) sensor of a general digital camera can collect information on a larger region than visible rays.

Specifically, a wavelength of a near-infrared region ranges from 700 nm to 1200 nm, which is longer than a wavelength of the visible region ranging from 350 nm to 750 nm. Therefore, infrared rays are less scattered and thus have an advantage in terms of transmission. Also, infrared images include useful information that is not seen in the visible region. For these reasons, when information included in an infrared image is used for image enhancement, it is possible to process an image properly.

However, such a method of merging an infrared image and a visible image has some problems. First, a process of merging two images involves pixel-to-pixel alignment, which may cause unavoidable blurring. Also, an exposure time increases due to light blocking by an infrared filter of a camera, and noise may occur in an image. Further, it is not easy to set a focus for capturing an infrared image.

As described above, information included in an infrared image is useful to enhance an image, but there are several problems in a method of additionally capturing the infrared image and merging the images together. Therefore, there is a need for a new method to replace the existing method.

DISCLOSURE

Technical Problem

The present invention is directed to providing an apparatus and method for enhancing an image using a color channel that can improve the quality of the image without using an additional infrared image but by using information included in an infrared region of the single image.

The present invention is also directed to providing a computer-readable recording medium storing a program for instructing a computer to execute a method for enhancing an image using a color channel that can improve the quality of the image without using an additional infrared image but by using information included in an infrared region of the single image.

Technical Solution

One aspect of the present invention provides an apparatus for enhancing an image using a color channel, the apparatus including: a pre-processing unit configured to generate an inverted image by inverting a luminance component estimated from a red (R) channel among color channels of a red, green, and blue (RGB) color space of an input image; a channel merging unit configured to generate a merged luminance (L) channel by merging an L channel of an International Commission on Illumination (CIE) L*a*b* (CIELab) color space of the input image and the inverted image; a contrast enhancement unit configured to enhance contrast by expanding a histogram of the merged L channel; and a color restoration unit configured to generate a restored image by combining the merged L channel whose contrast has been enhanced and chromaticity components of the input image and converting a resultant color image to the RGB color space.

Another aspect of the present invention provides a method of enhancing an image using a color channel, the method including: (a) generating an inverted image by inverting a luminance component estimated from an R channel among color channels of an RGB color space of an input image; (b) generating a merged L channel by merging an L channel of a CIELab color space of the input image and the inverted image; (c) enhancing contrast by expanding a histogram of the merged L channel; and (d) generating a restored image by combining the merged L channel whose contrast has been enhanced and chromaticity components of the input image and converting a resultant color image to the RGB color space.

Advantageous Effects

An apparatus and method for enhancing an image using a color channel according to the present invention enhance an image without using an additional infrared image but by using information on a red (R) channel among color channels of the single image, thereby providing an image enhancement algorithm that is simply implemented and has a high processing speed.

MODE FOR INVENTION

Hereinafter, exemplary embodiments of an apparatus and method for enhancing an image using a color channel according to the present invention will be described in detail with reference to the accompanying drawings. However, the present invention is not limited to the exemplary embodiments disclosed below, but can be implemented in various types. Therefore, the present exemplary embodiments are provided for complete disclosure of the present invention and to fully inform the scope of the present invention to those of ordinary skill in the art.

Figure 1:
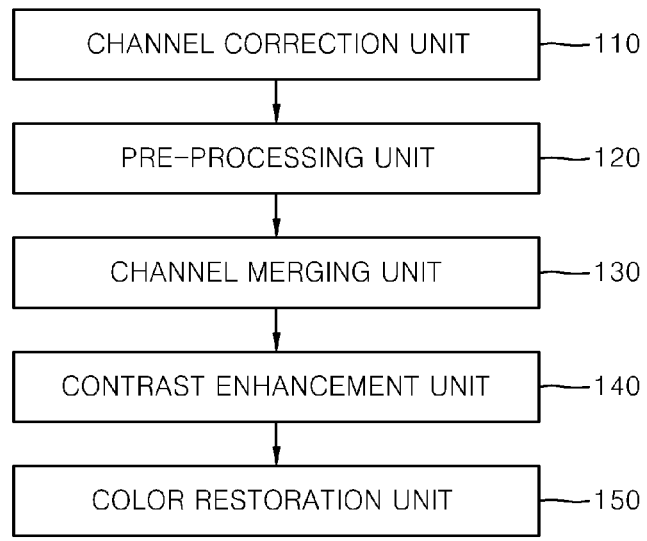
FIG. 1 is a block diagram showing a configuration of an exemplary embodiment of an apparatus for enhancing an image using a color channel according to the present invention.

FIG. 1 is a block diagram showing a configuration of an exemplary embodiment of an apparatus for enhancing an image using a color channel according to the present invention.

Referring to FIG. 1, an image enhancement apparatus according to the present invention includes a pre-processing unit 120, an image merging unit 130, a contrast enhancement unit 140, and a color restoration unit 150, and may further include a channel correction unit 110 to complement an image enhancement process. The pre-processing unit 120 generates an inverted image by inverting a luminance component estimated from a red (R) channel of an input image.

As described above, an image of an infrared region includes much more information than a visible region, and thus can be usefully used to improve the quality of an image. In consideration of the fact that some of the information on the infrared region is included in an image captured in the visible region, the image enhancement apparatus according to the present invention enhances an input image by merging a luminance (L) channel of the input image and a luminance component included in an R channel among color channels of the input image instead of an additionally captured infrared image.

Meanwhile, when too many components of the R channel are included in the input image, the input image may be excessively enhanced due to the components. Therefore, the channel correction unit 110 of the image enhancement apparatus according to the present invention introduces a correlation between each color channel in the red, green, and blue (RGB) color space of the input image and an L channel in the International Commission on Illumination (CIE) L*a*b* (CIELab) color space into an image enhancement process.

Specifically, the channel correction unit 110 calculates the correlation between each color channel (R, G, B) and the L channel of the input image as shown in Equation 1 below.

$$C_1 = \frac{\bar{\mu}_r}{\bar{\mu}_g}, C_2 = \frac{\bar{\mu}_r}{\bar{\mu}_b}, C_3 = \frac{\bar{\mu}_r}{\bar{\mu}_l}$$ [Equation 1]

$$C = \min\{C_1, C_2, C_3\}$$

Here, $C\eta(\eta=1, 2, 3)$ denotes the degree of significance of the R channel for the other channels of the input image, and is calculated as a ratio between averages $\bar{\mu}_r$ of the respective channels. Also, C denotes a minimum difference value ratio between the R channel and the other channels.

The channel correction unit 110 corrects the R channel of the input image using a difference between channels calculated by Equation 1. At this time, the R channel is selectively corrected by comparing the average luminance value of the R channel and the average luminance values of the other color channels as shown in Equation 2 below.

$$\tilde{O}_{red} = \begin{cases} C \cdot O_1, & \text{if } \mu_r > \mu_g \text{ and } \mu_r > \mu_b \\ O_{red}, & \text{otherwise} \end{cases}$$ [Equation 2]

Here, $\tilde{O}_{red}$ is a corrected R channel, $O_1$ is the L channel of the original image, and $O_{red}$ is the R channel of the original image.

In other words, when the average luminance value of the R channel is larger than the average luminance values of the G channel and the B channel, the channel correction unit 110 substitutes a product of the L channel of the input image and C of Equation 1, which is a weight, for the R channel. Otherwise, the channel correction unit 110 uses the R channel as it is. From now, $C \cdot O_1$ or $O_{red}$ output from the channel correction unit 110 will be referred to as a corrected R channel.

The pre-processing unit 120 performs a pre-processing for merging the R channel corrected by the channel correction unit 110 with the L channel. Here, when the channel correction unit 110 is not included in the image enhancement apparatus according to the present invention, the R channel of the input image can be subjected to a pre-processing and then merged with the L channel.

Specifically, a pre-processing process includes a process of estimating a luminance component from the R channel, and a process of inverting the estimated luminance component.

The corrected R channel can be decomposed into an illumination component and a reflectance component, which can be expressed as shown in Equation 3 below.

$$\tilde{O}_{red} = I_r \cdot R_r$$ [Equation 3]

Here, $I_r$ denotes the luminance component, and $R_r$ denotes the reflectance component.

The pre-processing unit 120 uses a bilateral filter to estimate the luminance component of the R channel, and the luminance component estimated by the bilateral filter is defined as shown in Equation 4 below.

$$\tilde{I}_r = \frac{1}{w_p} \sum_{q \in S} G_{\sigma_s}(\|p-q\|) G_{\sigma_r}(|\tilde{Q}_{red_p} - \tilde{O}_{red_q}|) \tilde{O}_{red_q}$$ [Equation 4]

Here, $\tilde{I}_r$ is the luminance component of the R channel estimated by the bilateral filter, S is a mask used for filtering, $W_p$ is a normalization factor, $G_{\sigma_s}$ is a spatial weight, and $G_{\sigma_r}$ is a range weight for luminance.

Bilateral filtering of the R channel of the input image preserves edge components that rapidly change according to luminance of the input image, and can minimize halo artifacts that may occur in a subsequent merging process with the L channel.

The pre-processing unit 120 generates an inverted image by inverting the luminance component estimated from the R channel of the input image. The inverted image is used as an indicator for determining the degree of enhancement in a subsequent image enhancement process.

Generation of the inverted image can be expressed as shown in Equation 5 below.

$$inv\tilde{I}_r = 1 - \tilde{I}_r$$ [Equation 5]

In this way, by generating the inverted image, it is possible to compress a dynamic region of the input image and enhance detailed information of both a dark region and a bright region of the input image.

In addition, the pre-processing unit 120 determines a weight to be used for merging the inverted image with the L channel of the input image.

The weight can be obtained from the inverted image generated by inverting the luminance component of the R channel of the input image and the L channel of the input image, and is determined by Equation 6 below.

$$\omega = \begin{cases} \max\{\omega_1, \omega_2\}, & \text{if } \bar{\mu}_1 < \tau \\ \min\{\omega_1, \omega_2\}, & \text{otherwise} \end{cases} \quad \text{[Equation 6]}$$

$$\omega_1 = \max(\widetilde{invI}_r) - \bar{\mu}_{\widetilde{invI}_r}$$

$$\omega_2 = \max(O_1) - \bar{\mu}_1$$

Here, $\bar{\mu}_{\widetilde{invI}_r}$ is the average luminance value of the inverted image, and $\bar{\mu}_1$ is the average luminance value of the L channel.

τ of Equation 6 is a threshold value that determines the degree of brightness and darkness of the input image, and is set in advance through a test. Specifically, the threshold value can be determined by analyzing a plurality of image frames obtained in three different exposure environments (−2 EV, 0 EV, +2 EV).

Figure 2:
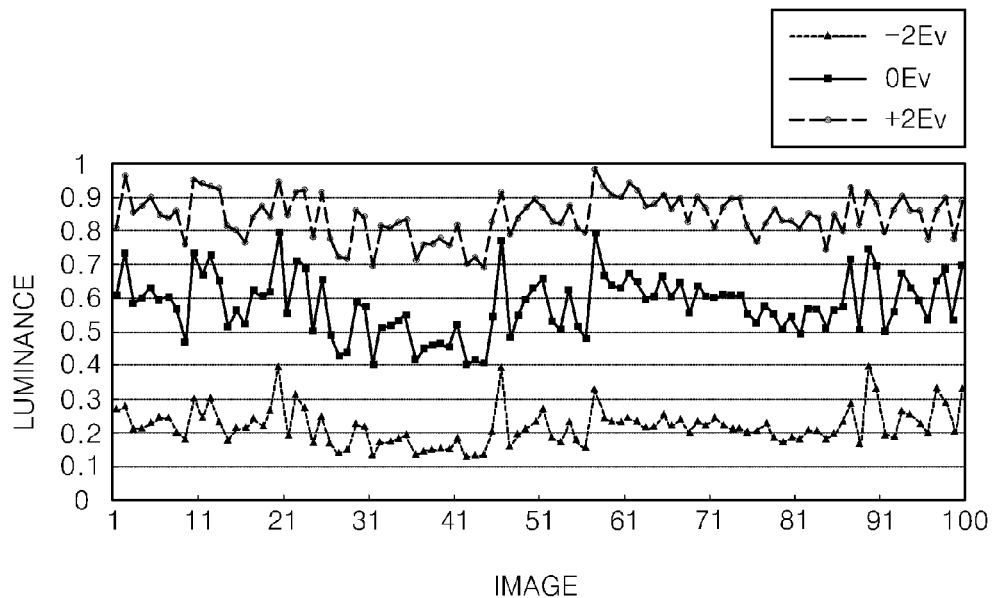
FIG. 2 is a graph showing average luminances of a plurality of image frames respectively captured in different exposure environments according to the exposure environments.

FIG. 2 is a graph showing the average luminances of a plurality of image frames respectively captured in different exposure environments (−2 EV, 0 EV, +2 EV) according to the exposure environments. Referring to FIG. 2, it is possible to see that a threshold value between a bright image and a dark image is about 0.4. In other words, an image having a luminance value smaller than 0.4 is a very dark image, and an image having a luminance value larger than 0.4 is an image captured in a proper exposure environment or an overexposed image. Therefore, the pre-processing unit 120 compares the threshold value set in this way with the average luminance value of the L channel, thereby determining the weight to be used for merging the inverted image with the L channel.

The channel merging unit 130 generates a merged L channel by merging the L channel of the input image with the inverted image. At this time, the weight determined by the pre-processing unit 120 is used, and the merging process is performed according to Equation 7 below.

$$O_L = \begin{cases} (1-\omega) \cdot \widetilde{invI}_r + \omega \cdot O_1, & \text{if } \bar{\mu}_1 < \tau \\ \omega \cdot \widetilde{invI}_r + (1-\omega) \cdot O_1, & \text{otherwise} \end{cases} \quad \text{[Equation 7]}$$

Here, $O_L$ is the merged L channel.

In this way, by merging the luminance component estimated from the R channel among the color channels of the input channel with the L channel of the input channel, it is possible to improve the quality of the image with the single image without using an additional infrared image.

The contrast enhancement unit 140 performs a process of enhancing the contrast of the input image by expanding a histogram of the merged L channel.

As described above, by combining the luminance component of the R channel of the input image and the L channel, it is possible to enhance detailed information of both a dark region and a bright region of the input image. However, there is a problem in that the contrast of the image is degraded and an unnatural image is generated.

Figure 3:
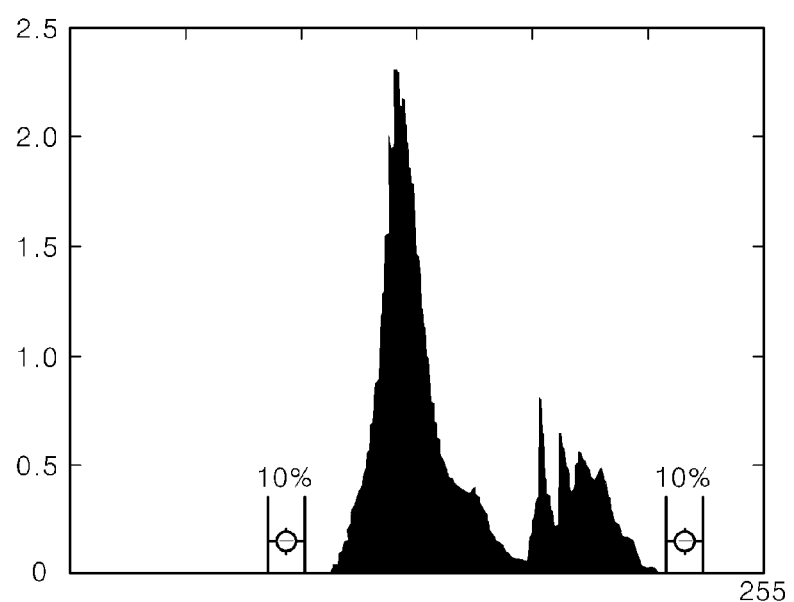
FIG. 3 is a diagram showing a histogram of an image for contrast enhancement.

To solve this problem, the contrast enhancement unit 140 can enhance the contrast of the input image by expanding a region of a low luminance level and a region of a high luminance level in a histogram of the merged L channel by a previously set ratio. As an exemplary embodiment, the expansion ratio of the histogram can be 10%. FIG. 3 is a diagram showing a histogram of an image for contrast enhancement, in which the histogram can be expanded based on a value 10% lower than the lowest luminance value of the image and a value 10% higher than the highest luminance value of the image.

The merged L channel whose histogram has been expanded can be expressed as shown in Equation 8 below.

$$\hat{O}_L = \frac{O_L - \text{Min}}{\text{Max} - \text{Min}} \times 100 \quad \text{[Equation 8]}$$

$$\text{Min} = \text{Min}(O_L) - (\text{Min}(O_L) \times 0.1)$$

$$\text{Max} = \text{Max}(O_L) - (\text{Max}(O_L) \times 0.1)$$

Here, $\hat{O}_L$ is the merged L channel whose histogram has been expanded.

The color restoration unit 150 generates a color image of the CIELab color space by combining the merged L channel whose histogram has been expanded and chromaticity components of the input image, and then converts the color image to the RGB color space, thereby generating a restored image.

Meanwhile, even when the contrast of the input image is enhanced by histogram expansion in this way, there may remain the problem of color distortion. To solve this problem, the color restoration unit 150 restores the colors of the input image by adding a color restoration factor to each color channel of the restored image in the RGB color space, and finally generates a resul image of improved quality.

A color restoration factor is a value set in pixel units for each of the RGB color channels of the restored image, and can be defined as shown in Equation 9 below.

$$CR_i(x, y) = \frac{O_i(x, y)}{\sum_{i \in \{R,G,B\}} O_i(x, y)} \quad \text{[Equation 9]}$$

Here, $CR_i(x,y)$ is a pixel-specific color restoration factor set for each color channel of the restored image, and $O_i(x,y)$ denotes an (x,y) pixel value of each color channel of the input image.

Finally, the result image is generated by Equation 10 below.

$$O_{CR}^i(x, y) = \hat{O}_i(x, y) + (CR_i(x, y) \cdot \alpha) - \gamma \quad \text{[Equation 10]}$$

Here, $O^i_{CR}(x,y)$ denotes an (x,y) pixel value of each of the RGB channels of the result image, $\hat{O}_i$ denotes an (x,y) pixel value of each of the RGB channels of the restored image, and α and γ respectively denote the saturation and the luminance adjustment value of the image having a value between 0 and 1.

In Equation 10, the larger the value of α, the higher the saturation and the luminance of the image. However, an increase in the luminance of an image does not necessarily exert a positive influence on the quality of the image. Therefore, to maintain the quality of the image, it is preferable to appropriately set the value of γ.

Figure 4:
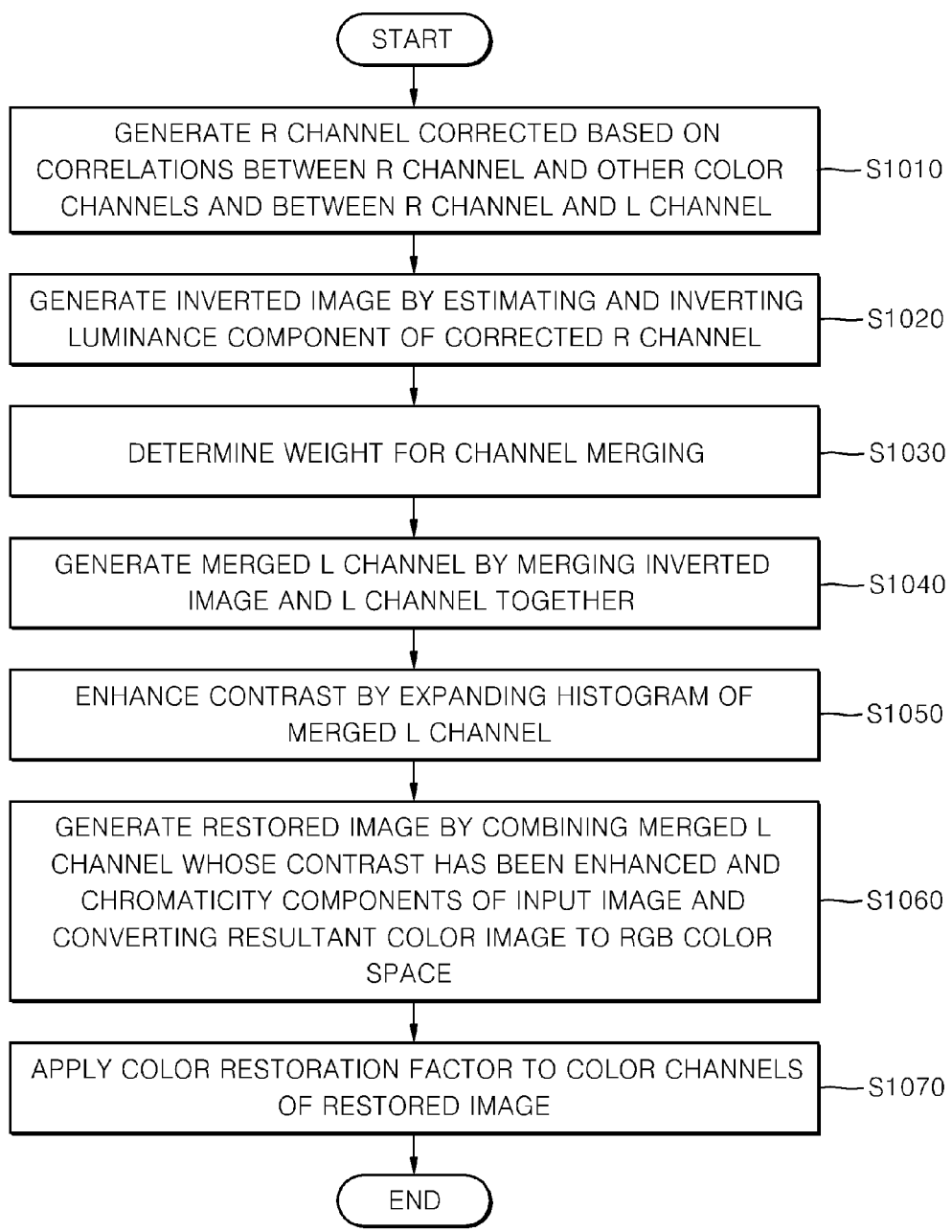
FIG. 4 is a flowchart illustrating a process of an exemplary embodiment of a method of enhancing an image using a color channel according to the present invention.

FIG. 4 is a flowchart illustrating a process of an exemplary embodiment of a method of enhancing an image using a color channel according to the present invention.

Referring to FIG. 4, the channel correction unit 110 generates an R channel corrected based on correlations between the R channel among the channels of the RGB color space of an input image and the other color channels and between the R channel and the L channel among the channels of the CIELab color space (S1010). Next, the pre-processing unit 120 estimates the luminance component of the corrected R channel using a bilateral filter, and generates an inverted image by inverting the estimated luminance component (S1020). Also, the pre-processing unit 120 determines a weight to be used in a subsequent channel merging process (S1030).

The channel merging unit 130 generates a merged L channel by merging the inverted image and the L channel using the determined weight (S1040). Next, the contrast enhancement unit 140 enhances the contrast of the input image by expanding a histogram of the merged L channel (S1050), and the color restoration unit 150 generates a restored image by combining the merged L channel whose contrast has been enhanced and chromaticity components of the input image and then converting a resultant color image to the RGB color space (S1060). Finally, the color restoration unit 150 generates a result image by applying a color restoration factor to each color channel of the restored image (S1070).

A test for evaluating the performance of the present invention was carried out. In the test, the present invention and existing image improvement algorithms were implemented using MATLAB 2008b and executed on Windows 7 with 3 GB random-access memory (RAM) and a 2.66 GHz Intel core i5 central processing unit (CPU). A comparison with an image enhancement method using a single image, such as a retinex algorithm, and a comparison with an image enhancement method of merging a visible image and an infrared image were separately made. Also, test images captured in various environments were used in the test.

Among image enhancement methods, which are comparison targets, a multi scale retinex with a color restoration (MSRCR) method is based on the fact that an image includes a luminance component and a reflectance component. In the MSRCR method, an illumination component is estimated using a multi-scale Gaussian kernel, and a luminance component is adjusted to enhance an image. Also, in a natural rendering of color image using retinex (NRCIR) method, which is another comparison target, a global tone mapping technique is used, and a filter shape is modified to prevent halo artifacts.

Table 1 below shows processing times of the existing image enhancement methods and the present invention in comparison with each other.

TABLE 1

| | Processing time (sec) | | |
|---|---|---|---|
| | MSRCR | NRCIR | Present invention |
| Test image 1 | 23.46 | 9.55 | 1.07 |
| Test image 2 | 18.31 | 9.31 | 1.05 |
| Test image 3 | 22.2 | 9.37 | 1.06 |
| Test image 4 | 39.04 | 16.10 | 1.62 |
| Test image 5 | 46.59 | 18.02 | 1.69 |
| Test image 6 | 32.85 | 12.83 | 1.28 |

Referring to Table 1, the present invention shows processing times that are averagely 10 to 30 times shorter than those of the existing NRCIR and MSRCR methods. This is because the MSRCR method involves a complex calculation for each channel and the NRCIR method involves many processing operations for enhancing a luminance channel.

The present invention can be implemented as computer-readable codes in a computer-readable recording medium. The computer-readable recording medium includes all types of recording media storing data that can be read by a computer system. Examples of the computer-readable recording medium include a read-only memory (ROM), a RAM, a compact disc ROM (CD-ROM), a magnetic tape, a floppy disk, an optical data storage, and so on. The computer-readable recording medium may also be implemented in the form of carrier waves (e.g., transmission via the Internet). In addition, the computer-readable recording medium may be distributed to computer systems over a network, in which computer-readable codes can be stored and executed in a distributed manner.

While the invention has been shown and described with reference to certain exemplary embodiments thereof, it will be understood by those of ordinary skill in the art that various changes in form and details may be made therein without departing from the spirit and scope of the invention as defined by the appended claims.

The invention claimed is:

1. An apparatus for enhancing an image, comprising:
a pre-processing unit configured to generate an inverted image by inverting a luminance component estimated from a red (R) channel among color channels of a red, green, and blue (RGB) color space of an input image;
a channel merging unit configured to generate a merged luminance (L) channel by merging an L channel of an International Commission on Illumination (CIE) L*a*b* (CIELab) color space of the input image and the inverted image;
a contrast enhancement unit configured to enhance contrast by expanding a histogram of the merged L channel; and
a color restoration unit configured to generate a restored image by combining the merged L channel whose contrast has been enhanced and chromaticity components of the input image and converting a resultant color image to the RGB color space.

2. The apparatus of claim 1, further comprising a channel correction unit configured to calculate a minimum difference value between channels from ratios between average luminance values of the R channel and the other color channels of the input image and between average luminance values of the R channel and the L channel and output the R channel corrected by applying the minimum difference value to the L channel when the average luminance value of the R channel is larger than the average luminance values of the other color channels,
wherein the pre-processing unit generates the inverted image from the corrected R channel.

3. The apparatus of claim 1, wherein the color restoration unit generates a result image by adding a previously set color restoration factor to each color channel of the restored image.

4. The apparatus of claim 3, wherein the color restoration factor is determined by Equation A below:

$$CR_i(x, y) = \frac{O_i(x, y)}{\sum_{i \in \{R,G,B\}} O_i(x, y)} \quad \text{[Equation A]}$$

where $CR_i(x,y)$ is a pixel-specific color restoration factor set for each color channel of the restored image, and $O_i(x,y)$ is an (x,y) pixel value of each color channel of the input image.

5. The apparatus of claim 1, wherein the pre-processing unit determines a weight based on an average luminance value of the L channel and an average luminance value of the inverted image, and
the channel merging unit merges the L channel and the inverted image using the weight.

6. The apparatus of claim 5, wherein the pre-processing unit determines the weight using Equation B below:

$$\omega = \begin{cases} \max\{\omega_1, \omega_2\}, & \text{if } \bar{\mu}_1 < \tau \\ \min\{\omega_1, \omega_2\}, & \text{otherwise} \end{cases} \quad \text{[Equation B]}$$

$$\omega_1 = \max(\text{inv}\tilde{I}_r) - \bar{\mu}_{\text{inv}\tilde{I}_r}$$

$$\omega_2 = \max(O_1) - \bar{\mu}_1$$

Here, $\omega$ is the weight, $\tau$ is a previously set threshold value, $\bar{\mu}_{\text{inv}I_r}$ is the average luminance value of the inverted image, $\bar{\mu}_l$ is the average luminance value of the L channel, $\text{inv}\tilde{I}_r$ is the inverted image, and $O_l$, is the L channel.

7. The apparatus of claim 1, wherein the pre-processing unit estimates the luminance component by applying a bilateral filter to the R channel.

8. A method of enhancing an image, comprising operations:
   (a) generating an inverted image by inverting a luminance component estimated from a red (R) channel among color channels of a red, green, and blue (RGB) color space of an input image;
   (b) generating a merged luminance (L) channel by merging an L channel of an International Commission on Illumination (CIE) L*a*b* (CIELab) color space of the input image and the inverted image together;
   (c) enhancing contrast by expanding a histogram of the merged L channel; and
   (d) generating a restored image by combining the merged L channel whose contrast has been enhanced and chromaticity components of the input image and converting a resultant color image to the RGB color space.

9. The method of claim 8, further comprising, before operation (a), operation (e) of calculating a minimum difference value between channels from ratios between average luminance values of the R channel and the other color channels of the input image and between average luminance values of the R channel and the L channel, and outputting the R channel corrected by applying the minimum difference value to the L channel when the average luminance value of the R channel is larger than the average luminance values of the other color channels,
wherein operation (a) includes generating the inverted image from the corrected R channel.

10. The method of claim 8, further comprising operation (f) of generating a result image by adding a previously set color restoration factor to each color channel of the restored image.

11. The method of claim 10, wherein the color restoration factor is determined by Equation A below:

$$CR_i(x, y) = \frac{O_i(x, y)}{\sum_{i \in \{R,G,B\}} O_i(x, y)} \quad \text{[Equation A]}$$

where $CR_i(x,y)$ is a pixel-specific color restoration factor set for each color channel of the restored image, and $O_i(x,y)$ is an (x,y) pixel value of each color channel of the input image.

12. The method of claim 8, wherein operation (a) includes determining a weight based on an average luminance value of the L channel and an average luminance value of the inverted image, and
operation (b) includes merging the L channel and the inverted image using the weight.

13. The method of claim 12, wherein operation (a) includes determining the weight using Equation B below:

$$\omega = \begin{cases} \max\{\omega_1, \omega_2\}, & \text{if } \bar{\mu}_1 < \tau \\ \min\{\omega_1, \omega_2\}, & \text{otherwise} \end{cases} \quad \text{[Equation B]}$$

$$\omega_1 = \max(\text{inv}\tilde{I}_r) - \bar{\mu}_{\text{inv}\tilde{I}_r}$$

$$\omega_2 = \max(O_1) - \bar{\mu}_1$$

Here, $\omega$ is the weight, $\tau$ is a previously set threshold value, $\bar{\mu}_{\text{inv}I_r}$ is the average luminance value of the inverted image, $\bar{\mu}_l$ is the average luminance value of the L channel, $\text{inv}\tilde{I}_r$ is the inverted image, and $O_l$ is the L channel.

14. The method of claim 8, wherein operation (a) includes estimating the luminance component by applying a bilateral filter to the R channel.

15. A non-transitory computer-readable recording medium storing a program for instructing a computer to execute the method of claim 8.

* * * * *